United States Patent [19]

Peltola

[11] Patent Number: 4,698,077
[45] Date of Patent: Oct. 6, 1987

[54] SEPARATING APPARATUS

[75] Inventor: Heikki Peltola, Soramäki, Finland

[73] Assignee: Flakt Aktiebolag, Stockholm, Sweden

[21] Appl. No.: 818,336

[22] Filed: Jan. 13, 1986

[30] Foreign Application Priority Data

Jan. 16, 1985 [FI] Finland .................................. 850301

[51] Int. Cl.⁴ ............................................ E01D 45/12
[52] U.S. Cl. ........................................ 55/204; 55/211; 55/345; 162/55; 210/512.2
[58] Field of Search ................. 162/55, 380, 381, 258; 55/204, 210, 211, 345, 205; 210/194, 195.1, 512.2; 209/144, 211

[56] References Cited

U.S. PATENT DOCUMENTS 2,047,136  7/1936  Doyle ..................................... 162/55
4,283,275  8/1981  Heinbockel et al. .................. 162/55

OTHER PUBLICATIONS

"Solvo-Information", No. 17, 3 pages, no date.

Primary Examiner—Frank Sever
Attorney, Agent, or Firm—Fitch, Even, Tabin & Flannery

[57] ABSTRACT

The invention relates to an apparatus for the separation of edge trimmings, in connection with a pulper. The upper portion of the jacket of the pulper (1) serves as a jacket of a first cyclone (5), a second cyclone (8) opposite in direction being provided within said cyclone (5). When the air flow enters the second cyclone and the direction thereof is reversed, it is essentially retarded, whereby also light paper particles fall into the stock contained in the pulper. The object is to provide an efficient device for the separation of edge trimmings, which device does not spread dust in the surroundings.

12 Claims, 2 Drawing Figures

SEPARATING APPARATUS

In paper production, relatively large amounts of surplus paper are formed, especially so called edge trimmings. Such surplus paper is fed back into the process, i.e. into a so called pulper.

Previously the most common practice has been to first cut the edge trimmings and the like paper into relatively small pieces in a fan provided with blades, whereafter the paper pieces have been fed through an overpressure pipe into a pulper having an open upper end. Disadvantages of this practice are the noise in connection with the cutting of the paper and an abundant dust formation above the pulper.

The object is to provide a new apparatus for the separation of edge trimmings and the like, in connection with a pulper, which apparatus eliminates the above disadvantages.

The apparatus according to the invention is characterized in that it comprises at least one cyclone provided in connection with the upper portion of the pulper. The upper portion of the jacket of the pulper preferably serves as the cyclone jacket as well.

One cyclone may suffice, if the paper in question is relatively coarse i.e. heavy. In order to increase the efficiency of the separating properties, especially in view of finer paper, there is, according to a preferred embodiment of the invention, arranged a second cyclone within the first one, the second cyclone being reversed, i.e. opposite in direction with respect to the first cyclone. When the direction of the air flow is reversed on entering the second cyclone, it is essentially retarded, whereby also light paper particles fall into the stock contained in the pulper.

The cover of the pulper can be provided with water nozzles, whereby the paper which has possibly remained on the surface of the stock is pressed down into the stock by intermittent water sprays through said nozzles.

The invention will be described more closely in the following with reference to the attached schematical drawing.

Figure 1:
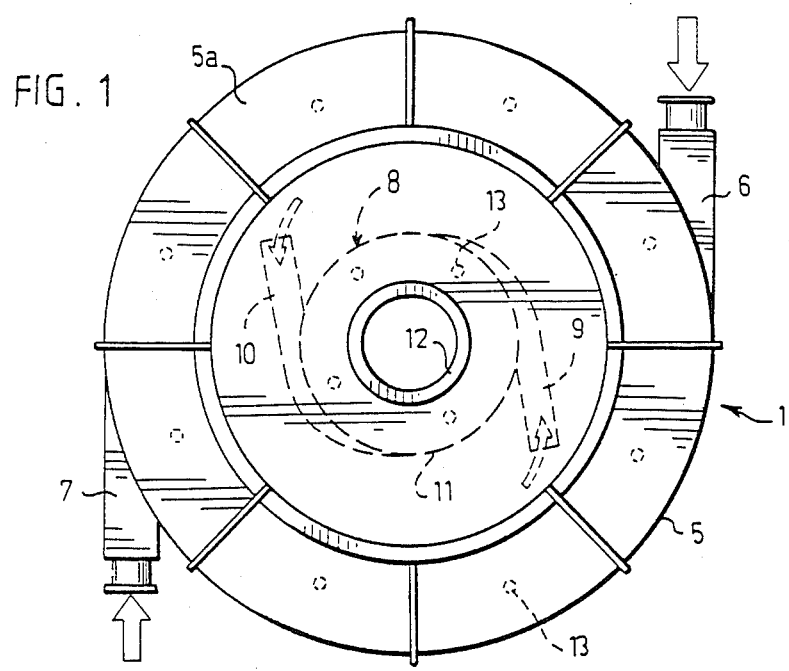
FIG. 1 is a top view of a pulper provided with a separating apparatus.

In the drawing, the pulper is generally indicated by the reference numeral 1, the stock contained in the pulper being indicated by the reference numeral 2. The reference numeral 3 indicates a stock agitator propeller which is driven by an electrical motor 4. The stock discharge pipe is not shown in the drawing.

The upper portion of the jacket of the pulper forms the jacket of a first cyclone 5. A cover of the cyclone 5, which cover closes the pulper, is indicated by the reference 5a and cyclone inlets by 6 and 7, the reference numeral 6a indicating separate conduits of the inlet 6. A second cyclone 8 is positioned within the first cyclone 5, preferably in the middle thereof. Said cyclone 8 is opposite in direction with respect to the first cyclone 5 and replaces the central pipe of the cyclone 5. Inlets of the second cyclone 8 are indicated by 9 and 10, and the jacket 11 of the cyclone 8 extends to a certain extent down into the stock 2, whereby the stock surface 2a rises slightly within the jacket 11 under the influence of underpressure. A fan 15 sucks the air flow out of the cyclone 8 through a central pipe 12 thereof.

Figure 2:
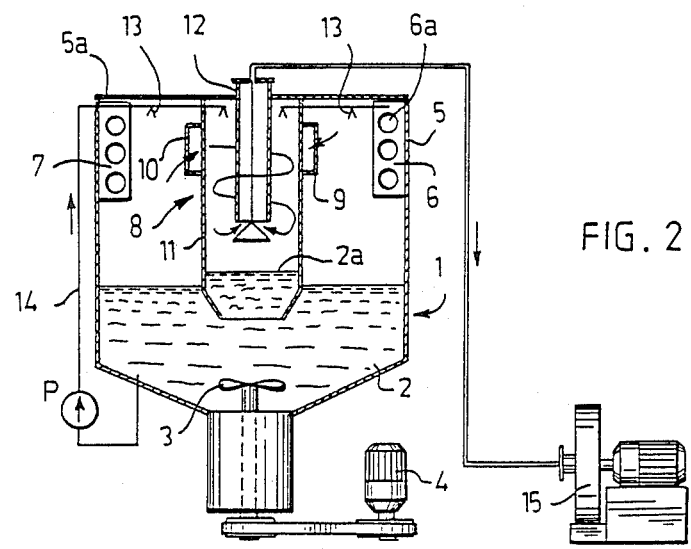
FIG. 2 is a vertical section of the pulper.

The reference numeral 13 indicates water nozzles positioned in the cover(s) of the cyclones 5 and 8, whereby the paper which has remained on the surface of the stock is pressed down into the stock by intermittent water sprays through said nozzles. The reference numeral 14 indicates a circulation pipe for the spray water, including a pump. However, the stock 2 may be too thick for the system of FIG. 2 to be operative in this respect, whereby the water required is obtained from somewhere else.

By virtue of the apparatus according to the invention, edge trimmings and the like can be passed into the pulper as such without any cutting thereof, thus avoiding the formation of dust. The number of the conduits 6a can be chosen to meet the requirements of each particular case. A plurality of edge trimmings can be passed through each conduits 6a. Said conveyor pipes from different locations are not more closely shown in the drawing nor means for adjusting the flow rate and the pressure. The required vacuum in the pulper is dependent on the material to be conveyed, the conveying distance and, more or less, the speed of the blades. The vacuum required for the conveyance can be adjusted by means of a vane adjuster provided in the sucking opening of the fan or by varying the speed of rotation of the drive motor of the fan.

I claim:

1. An apparatus for the production of stock for paper using edge trimmings from paper, the apparatus comprising in combination
    a pulper having an upper and lower portion, the pulper being adapted to contain stock; an agitator in the lower portion of the pulper for the agitation of stock;
    a first cyclone in the upper portion of the pulper to provide edge trimmings for the stock; and
    a second cyclone disposed within the first cyclone, the second cyclone having an air flow direction opposite that of the first cyclone, the first and second cyclones providing edge trimmings for the stock with a minimization of dust formation.

2. An apparatus as recited in claim 1 wherein the pulper includes a jacket, the upper portion of the jacket for the pulper also comprising a jacket for the first cyclone.

3. An apparatus as recited in claim 2 wherein the second cyclone includes at least two inlets.

4. An apparatus as recited in claim 2 wherein the apparatus further includes at least two water nozzles in the upper portion of the pulper adapted to provide a spray of water to press paper on the surface of stock in the pulper into the stock.

5. An apparatus as recited in claim 2 wherein the the second cyclone includes a second jacket adapted to extend into the stock, the surface of the stock raising within the second cyclone under the influence of suction.

6. An apparatus as recited in claim 5 wherein the apparatus further comprises a pipe disposed within the second cyclone for suction therefrom.

7. An apparatus as recited in claim 1 wherein the second cyclone includes at least two inlets.

8. An apparatus as recited in claim 1 wherein the apparatus further includes at least two water nozzles in the upper portion of the pulper adapted to provide a spray of water to press paper on the surface of stock in the pulper into the stock.

9. An apparatus as recited in claim 8 wherein the the second cyclone includes a second jacket adapted to extend into the stock, the surface of the stock raising within the second cyclone under the influence of suction.

10. An apparatus as recited in claim 9 wherein the apparatus further comprises a pipe disposed within the second cyclone for suction therefrom.

11. An apparatus as recited in claim 1 wherein the the second cyclone includes a second jacket adapted to extend into the stock, the surface of the stock raising within the second cyclone under the influence of suction.

12. An apparatus as recited in claim 11 wherein the apparatus further comprises a pipe disposed within the second cyclone for suction therefrom.

* * * * *